D. D. MILES.
COTTON HARVESTER.
APPLICATION FILED SEPT. 10, 1900.

976,132.

Patented Nov. 15, 1910.

Witnesses.
F. B. Fay
N. M. Flarell.

Inventor.
Don D. Miles

UNITED STATES PATENT OFFICE.

DON D. MILES, OF AURORA, ILLINOIS, ASSIGNOR, BY MESNE ASSIGNMENTS, TO COLUMBIAN COTTON HARVESTER COMPANY, OF CHICAGO, ILLINOIS, A CORPORATION OF WEST VIRGINIA.

COTTON-HARVESTER.

976,132.     Specification of Letters Patent.     Patented Nov. 15, 1910.

Original application filed March 16, 1900, Serial No. 8,921. Divided and this application filed September 10, 1900. Serial No. 29,552.

*To all whom it may concern:*

Be it known that I, DON D. MILES, a citizen of the United States, residing at Aurora, in the county of Kane and State of Illinois, have invented a certain new and useful Improvement in Cotton-Harvesters, of which the following is a specification.

My invention relates to improvements in cotton harvesters and has for its object to provide a new and improved spiral picking spindle and guide.

My invention is illustrated in the accompanying drawings, wherein—

Figure 1:
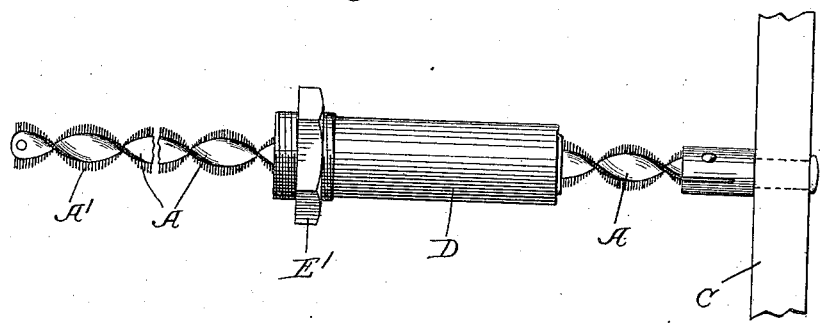
Figure 2:
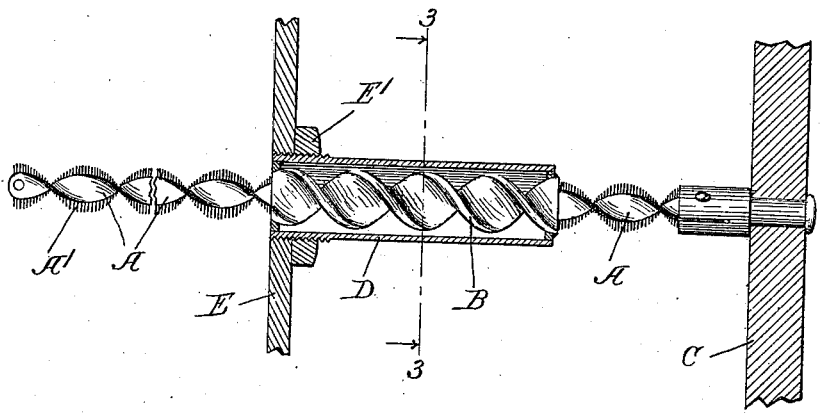
Figure 3:
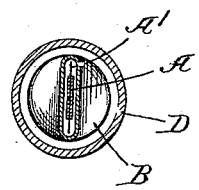

Figure 1 is a view of a picking device embodying my invention; Fig. 2 is a longitudinal section of the guide through which the picker passes; Fig. 3 is a section on line 3—3, Fig. 2.

Like letters refer to like parts throughout the several figures.

The present application is a divisional application, being part of the subject matter of a prior application for cotton harvesters made by me March 16, 1900, Serial Number 8921.

In carrying out my invention, I provide a picker A adapted to engage the cotton. This picker may be formed in any desired manner and as herein illustrated consists of two strips of metal fastened together with a piece of haircloth or the like between them and arranged so that a series of picking points $A^1$ project past the edges of the strips. These strips are twisted in the form of a spiral, as shown in Figs. 1 and 2. The picking points $A^1$ may of course be made of any other material, but are preferably of material which will yield, so as to form yielding picking points. The picker passes through a spiral guide or wiper device B. This spiral guide may be formed in any desired manner, but is preferably constructed of a tube twisted into a spiral shape. It will be seen that, when the picker is reciprocated in this tubular spiral wiper or guide, the picker will be rotated. In using the device, the guide is preferably held by some part of the machine and the picker is connected with a moving part of the machine so as to be reciprocated.

In the present case, I have only illustrated the picker and associated parts and have not shown the machine in connection with which the picker is used, as such machine is no part of my present invention and reference is had to my prior application for a description of this machine.

The picker is rotatably connected with some moving part on the machine, as shown at C, so that it is free to rotate when reciprocated. I prefer to place the spiral guide B within an inclosing art or tube D, which holds it in position, said tube being connected with the part E of the cotton harvesting machine in any desired manner. As herein shown, the tube D is provided with screw-threads and is screwed into an opening in the part E, the tube being held in place by the lock nut $E^1$.

I have illustrated a particular construction embodying my invention, but it is of course evident that the parts may be varied and I therefore do not limit myself to the particular construction illustrated.

The use and operation of my invention are as follows: When the device is brought in proximity to the cotton, some means is provided for reciprocating the picker in the guide or wiper device B. This reciprocation produces a rotation of the picker. The engaging or picking points $A^1$ then become entangled in the cotton so as to remove it from the plant. When the picker is withdrawn or retracted into the part B, the cotton is wiped off or removed from the picker and may be handled in any desired manner. It will be seen that the spiral guide B acts as a means for rotating the picking spindle when reciprocated and also acts as a wiper device to remove the cotton therefrom.

The outer tube D is provided at each end with end-pieces connected thereto and provided with slots into which are received the flattened ends of the spiral tube B. The end-pieces act to fasten the spiral tube B to the outer tube D so as to form a unitary structure which can be handled as one piece.

I claim:

1. The combination with a spiral picker of a spiral guide through which the picker passes, a tube surrounding said spiral guide, and means for fastening the spiral guide to the outer tube so as to form a unitary structure.

2. The combination with a spiral picker of a guide comprising a tube twisted into a spiral an outer tube surrounding the spiral tube, end-pieces at each end of the outer tube provided with slots into which the ends of the spiral tube are received.

3. A guide for spiral cotton pickers comprising an outer tube, an end-piece at each end of said tube, said end-pieces provided with slots, a spiral tube within the outer tube having its ends contained within the said slots, so that the spiral tube is supported by the end-pieces.

4. A guide for spiral cotton pickers comprising an outer tube, an end-piece at each end of said tube, said end-pieces provided with slots, a spiral tube within the outer tube having its ends contained within the said slots, so that the spiral tube is supported by the end-pieces, a support having a screw threaded opening, the end of the outer tube being screw threaded and fitting in said opening.

5. A guide for cotton pickers comprising a spiral tube through which the picker passes, an outer tube surrounding said spiral tube, the two tubes connected together, a support to which one end of said outer tube is connected, the other end being free.

6. A guide for spiral cotton pickers comprising a tube, a supporting part to which it is fastened and beyond which it projects, and a spiral guide device in said tube.

7. A guide for spiral cotton pickers comprising a spiral tube, a support therefor beyond which the spiral tube projects, and means for holding said spiral tube perpendicular to said support.

DON D. MILES.

Witnesses:
F. B. FAY,
H. M. FLARELL.